United States Patent
Lakshmikanthan et al.

(10) Patent No.: US 8,084,884 B1
(45) Date of Patent: Dec. 27, 2011

(54) ADAPTIVE GATE DRIVE SYSTEMS AND METHODS

(75) Inventors: Srikanth Lakshmikanthan, Milpitas, CA (US); Eduardo M. Lipiansky, Danville, CA (US)

(73) Assignee: Google Inc., Mountain View, CA (US)

( * ) Notice: Subject to any disclaimer, the term of this patent is extended or adjusted under 35 U.S.C. 154(b) by 205 days.

(21) Appl. No.: 12/498,821

(22) Filed: Jul. 7, 2009

(51) Int. Cl.
H02J 1/10 (2006.01)
(52) U.S. Cl. .......................................... 307/52; 307/82
(58) Field of Classification Search .................. 307/31, 307/52, 82
See application file for complete search history.

(56) References Cited

U.S. PATENT DOCUMENTS

| | | | |
|---|---|---|---|
| 4,713,742 A | 12/1987 | Parsley | |
| 6,670,794 B1 * | 12/2003 | Wang et al. | 323/213 |
| 6,836,100 B2 * | 12/2004 | Egan et al. | 323/272 |
| 7,092,265 B2 | 8/2006 | Kernahan | |
| 7,385,377 B2 | 6/2008 | Pisasale et al. | |
| 7,471,051 B1 * | 12/2008 | Wacknov et al. | 315/291 |
| 2008/0278131 A1 | 11/2008 | Park et al. | |

OTHER PUBLICATIONS

Huang et al., A Scalable Multiphase Buck Converter with Average Current Share Bus, 2003, pp. 1-7.
CHiL Seimconductor, CHL8316 Preliminary Product Brief, Rev. 0.30, Oct. 7, 2008, pp. 1-4.
Herbert, Multiphase Buck Converter vs. Switched Current Power Converter, Mar. 13, 2006, 19 pages.
Nagaraja et al., Design and Analysis of Four-Phase Synchronous Buck Converter for VRM Applications, IEEE, Dec. 20-22, 2004, pp. 575-580.
intersil® ISL6535, Data Sheet, May 5, 2008, 14 pages.
Primarion PX3538, Product Brief, Sep. 1, 2006, 2 pages.
Primarion PX3538, Datasheet, Dec. 29, 2006, 26 pages.
intersil® PX3511D, Data Sheet, Feb. 26, 2007, 10 pages.
CHiL Semiconductor, CHL8318 Preliminary Product Brief, Rev. 0.30, Oct. 7, 2008, 5 pages.

* cited by examiner

*Primary Examiner* — Jared Fureman
*Assistant Examiner* — Adi Amrany
(74) *Attorney, Agent, or Firm* — Lerner, David, Littenberg, Krumholz & Mentlik, LLP

(57) ABSTRACT

Aspects of the invention pertain to optimization of voltage converter efficiency for all load conditions. A signal conditioning circuit is electrically connected to a number of buck converter modules that supply power to different loads. Each module includes a voltage regulator module, which issues a signal that is proportional for its respective load current. The signal conditioning circuit integrates and averages the signals from each voltage regulator module to produce a conditioned voltage signal. The conditioned signal drives a controller, which in turn provides control information to a power conversion circuit. Operation of the signal conditioning circuit cause the controller and power conversion circuit to adapt the driver voltage of the buck converter modules, which improves and optimizes efficiency for all loads.

8 Claims, 7 Drawing Sheets

ADAPTIVE GATE DRIVE SYSTEMS AND METHODS

BACKGROUND OF THE INVENTION

1. Field of the Invention

Aspects of the invention relate generally to power conversion applications. More particularly, aspects are directed to optimization of multi-phase voltage converter efficiency regardless of load conditions.

2. Description of Related Art

Power conversion equipment is used to provide regulated power and a specified load current to a wide variety of devices, including microprocessors used in computers. Some equipment such as multi-phase buck voltage converters are designed to provide larger output current handling capabilities than single phase devices. For instance, a single phase converter providing a 100 A output current requires a MOSFET pair switch that is capable of supporting the full 100 A current.

Due to limitations in current ratings of such components, multiple phases are designed to carry the full load current. Thus, if five phases were employed to handle 100 A, the total current per phase is reduced by a factor of five. Some applications provide solutions having a fixed number of phases and a fixed gate drive voltage regardless of load variations.

By increasing the number of phases, the load current is divided by the number of phases. However, the power to drive the MOSFETs for the multiple phases increases. MOSFET driver power ($P_{driver}$) is directly proportional to the combined MOSFET gate charge ($Q_G$), switching frequency ($F_{SW}$) and driver voltage ($V_{DRIVER}$) according to the following equation:

$$P_{driver} = Q_G \times F_{SW} \times V_{DRIVER} \quad (1)$$

Power for the MOSFET driver is constant for a given MOSFET combination (which determines the MOSFET total gate charge $Q_G$), switching frequency and drive voltage. If the same MOSFETs are used in all phases, the MOSFET driver power number is multiplied by the total number of phases. Conduction losses are proportional to the square of the load current ($I_{LOAD\_CURRENT}$) MOSFET "on" resistance ($R_{DS-ON}$) and duty cycle, which is the ratio of output voltage to input voltage in a buck regulator. Total power conduction losses for both MOSFETs may be calculated according to the following equation:

$$P_{CONDUCTION\_LOSS} = I^2_{LOAD\_CURRENT} \times R_{DS-ON} \quad (2)$$

Systems and methods which reduce such conduction losses and adapt the driver voltage in multi-phase voltage converter applications are provided herein.

SUMMARY OF THE INVENTION

In accordance with one embodiment of the invention, a power control architecture comprises a plurality of multi-phase buck converter modules, each module electrically connected to a load, each of the multi-phase buck converter modules being adapted to generate a load current monitor signal for its respective load; a signal conditioning circuit electrically connected to each of the multi-phase buck converter modules, the signal conditioning circuit adapted to receive the load current monitor signals from each multi-phase buck converter module and to generate a conditioned signal therefrom; a controller adapted to receive the conditioned signal from the signal conditioning circuit and to generate control information based upon the conditioned signal; and a power conversion circuit adapted to receive the control information from the controller and to issue a variable driver voltage signal to each of the multi-phase buck converter modules to reduce conduction losses associated with each multi-phase buck converter module supplying power to its respective load.

In one example, each multi-phase buck converter module includes a voltage regulator module that generates the load current monitor signal in response to a power signal supplied to the load of its respective multi-phase buck converter module. In one alternative, the signal conditioning circuit includes a signal processing apparatus for integrating and averaging of the load current monitor signals and for issuing an output signal used to generate the conditioned signal. Here, the signal conditioning circuit may further include a multiplexer that receives the output signal from the signal processing apparatus, multiplexes the output signal with a power signal upon receipt of a control signal, and generates the conditioned signal.

In another example, the power conversion circuit comprises a buck converter having a pair of transistors electrically connected to an inductive device. In this case, the inductive device may have a first end and a second end. Here, the pair of transistors are MOSFETS electrically connected to the first end of the inductive device, and the variable driver voltage signal issues from the second end of the inductive device.

In accordance with another embodiment, a power control architecture comprises multi-phase converter means for generate load current monitor signaling for a plurality of loads; signal conditioning means for receiving the load current monitor signaling from the multi-phase converter means and for generating a conditioned signal therefrom; control means for receiving the conditioned signal from signal conditioning means and for generating control information based upon the conditioned signal; and power conversion means for receiving the control information from the control means and for issuing a variable driver voltage signal to the multi-phase converter means to reduce conduction losses associated with the multi-phase converter means supplying power to the plurality of loads.

In one example, the signal conditioning means includes signal processing means for integrating and averaging of the load current monitor signaling and for issuing an output signal used to generate the conditioned signal. In an alternative, the signal conditioning means further includes multiplex means for receiving the output signal from the signal processing means, multiplexing the output signal with a power signal upon receipt of a control signal, and generating the conditioned signal.

In a further embodiment, a power control apparatus comprises a signal conditioning circuit electrically connected to each phase of a plurality of multi-phase buck converter modules, the signal conditioning circuit adapted to receive load current monitor signals from each multi-phase buck converter module and to generate a conditioned signal therefrom; a controller adapted to receive the conditioned signal from the signal conditioning circuit and to generate control information based upon the conditioned signal; and a power conversion circuit adapted to receive the control information from the controller and to issue a variable driver voltage signal to each of the plurality of multi-phase buck converter modules to reduce conduction losses associated with each multi-phase buck converter module supplying power to its respective load.

In one example, the signal conditioning circuit includes a signal processing apparatus for integrating and averaging of the load current monitor signals and for issuing an output signal used to generate the conditioned signal. In an alternative, the signal processing apparatus further includes a variable gain mechanism to adjust a gain of the output signal. In another alternative, the signal conditioning circuit further includes a multiplexer that receives the output signal from the signal processing apparatus, multiplexes the output signal with a power signal upon receipt of a control signal, and generates the conditioned signal.

In yet another example, the power conversion circuit comprises a buck converter having a pair of transistors electrically connected to an inductive device. In one alternative, the inductive device has a first end and a second end, the pair of transistors are MOSFETS electrically connected to the first end of the inductive device, and the variable driver voltage signal issues from the second end of the inductive device.

In accordance with another embodiment, a power control method comprises receiving load current monitor signals from a plurality of multi-phase buck converter module; generating a conditioned signal from the received load current monitoring signals; generating control information based upon the conditioned signal; and issuing a variable driver voltage signal to each of the plurality of multi-phase buck converter modules to reduce conduction losses associated with each multi-phase buck converter module supplying power to its respective load.

In one example, prior to generating the conditioned signal, the method further comprises integrating and averaging of the load current monitor signals; and issuing an output signal used to generate the conditioned signal. In one alternative, the method further comprises varying a gain of the output signal. And in another alternative, the method further comprises multiplexing the output signal with a power signal upon receipt of a control signal to generate the conditioned signal.

DETAILED DESCRIPTION

Aspects, features and advantages of the invention will be appreciated when considered with reference to the following description of preferred embodiments and accompanying figures. The same reference numbers in different drawings may identify the same or similar elements. Furthermore, the following description is not limiting; the scope of the invention is defined by the appended claims and equivalents.

Adaptive MOSFET drive control is provided for efficiency optimization. According to an embodiment, the efficiency for the entire load range is optimized by balancing driver power, conduction losses, switching losses and the number of active phases. In one example, a light load condition such as less than or equal to 30% of the full load current, the MOSFET driver power is reduced by reducing the driver voltage. This will increase the MOSFET's on resistance ($R_{DS-ON}$) and therefore the conduction loss. However, because the current is low, the increase in conduction loss is more than offset by the reduction in driver power. The result is an increased efficiency for light loads.

However, a reduced driver voltage may not be ideal for higher loads (e.g., 75%-100% of full load current) as the conduction losses increase by the square of the load current as shown by equation 2 above. Therefore, the MOSFET driver voltage may be increased to reduce the conduction loss at the expense of gate driver power. In order to obtain optimized driver voltage for the full load range (0%-100%), an adaptive solution is employed, as will be described in detail below.

Figure 1:
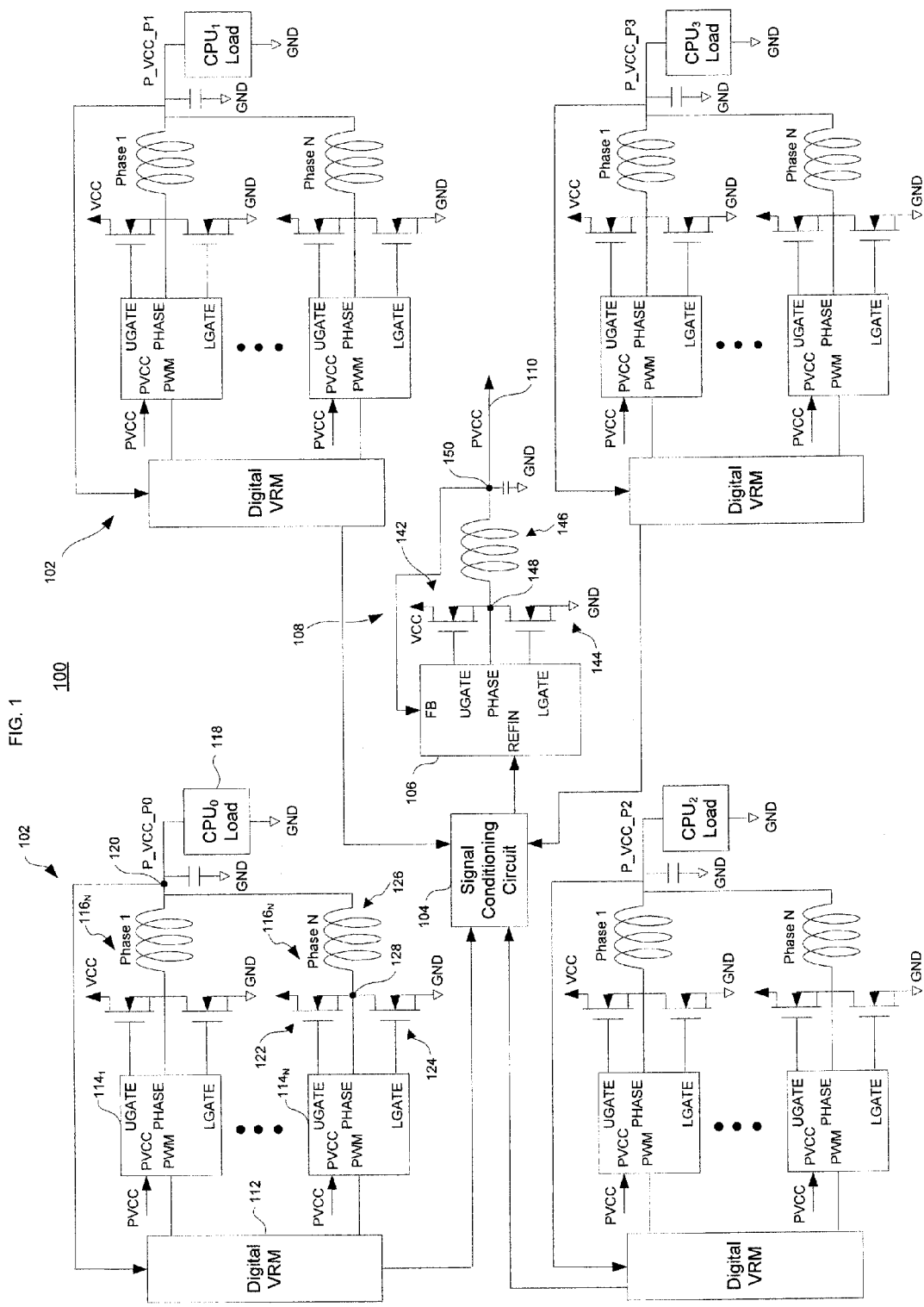
FIG. 1 is a block diagram of a multi-phase system architecture in accordance with aspects of the invention.

FIG. 1 illustrates a multi-phase system architecture 100 according to one embodiment. As shown, four multi-phase buck converter modules 102 are shown electrically coupled to a signal conditioning circuit 104, which in turn is electrically connected to a controller 106 and a gate drive power conversion circuit 108. The output signal 110 of circuit 108 provides variable gate drive control to the power MOSFETS in the modules 102 via signal PVCC.

Each multi-phase buck converter module 102 includes a digital voltage regulator module (DVRM) 112. While a digital VRM is employed in the present example, depending on the configuration, analog VRMs may alternatively be employed. Each DVRM 112 is electrically connected to multiple drivers 114 (e.g., $114_1$ to $114_N$). Each driver is, in turn, electrically connected to a MOSFET-type buck converter 116 (e.g., $116_1$ to $116_N$). The outputs of the buck converters 116 for a given module 102 are connected to a respective load 118, which may include devices such as processors (e.g., $CPU^0$, $CPU'$, $CPU_2$ or $CPU_3$). While MOSFETS are shown, other transistor types may be used in the buck converters.

According to one example, each DVRM 112 may handle six phases, although depending on the design of the DRVM 112, any number of phases may be employed. The DVRMs 112 receive a signal (P_VCC_P0, P_VCC_P1, P_VCC_P2 or P_VCC_P3) from respective node 120. Those signals are the output voltages of each of the four power converters. The DVRMs controllers 112 provide a pulse width modulation (PWM) signal to each driver 114 in the respective module 102. The PWM signals are non-overlapping upper and bottom drivers gate drive signals for the top and the bottom MOSFET of each phase. In addition, the DVRM controller 112 provides total current load information encoded in predetermined signal pins, by programmatically selecting to output the PWM load current information. This may be, e.g., a PWM signal or an analog signal proportional to the current load. The current is calculated by multiplying a proportionality constant (e.g., 1.65 A) by the duty cycle. In one example, the PWM signal (or analog signal) is filtered and multiplied by a gain factor to produce a voltage signal that is proportional to the current load. Low pass filtering of the PWM signal results in an analog voltage that is proportional to the total current drawn. The DVRMs 112 may be, by way of example only, PX3538, PX3560 or PX8560 chips provided by Primarion, Inc. Details of the PX3538 chip may be found in specification sheets PD-3538-002B and PDB-3538-001A, each © 2006, Primarion, Inc., the entire disclosures of which are hereby expressly incorporated by reference herein. In the case of the PX3538 chip, the total current load information may be encoded on either the FAULT 1 or FAULT 2 signal pins. Such pins provide programmable outputs for per phase current monitoring.

As shown in FIG. 1, the drivers 114 receive the PVCC signal from output 110 of circuit 108, in addition to the PWM signal provided by DVRM 112. Each driver 114 is coupled to an upper MOSFET 122, a lower MOSFET 124 and an inductor 126 of the buck converter 116 for a given phase. In particular, the driver issues a first signal (UGATE) to the gate of the upper MOSFET 122 and a second signal (LGATE) to the gate of the lower MOSFET 124. A third signal (PHASE) is connected to the driver via node 128. The DVRM controller generated non-overlapping PWM signals feed each of the top/bottom MOSFET driver pairs. The drivers 114 may be, by way of example only, PX3511D chips provided by Intersil.

Details of the PX3511D chip may be found in data sheet FN6463.0, published Feb. 26, 2007 by Intersil, the entire disclosure of which is hereby expressly incorporated by reference herein.

FIG. 1 illustrates that the DVRMs 112 provide signals to the signal conditioning circuit 104. These signals may issue as fault conditions as determined by the DVRMs 112. In particular, the signals the DVRMs 112 generate may represent fault conditions relating to the loads (e.g., CPU°, CPU', CPU$_2$ and CPU$_3$) powered by the buck converters. In the case of the PX3538 chip, the DVRM controller 112 generates a pulse width modulated load current monitor output available upon programming the appropriate FAULT1 or FAULT2 bit registers. The correct setting of the bits on either the FAULT1 or FAULT2 registers causes the PWM load current monitor signal to be routed to output pins FAULT1 or FAULT2. External to the DVRM controller chip, the signal conditioning circuit 104 low-pass filters the PWM load current monitor signal, such as with a first-order RC filter (this operation is also an integration in the time-domain), for example with a 1 KΩ resistor and a 100 nF capacitor.

Figure 2:
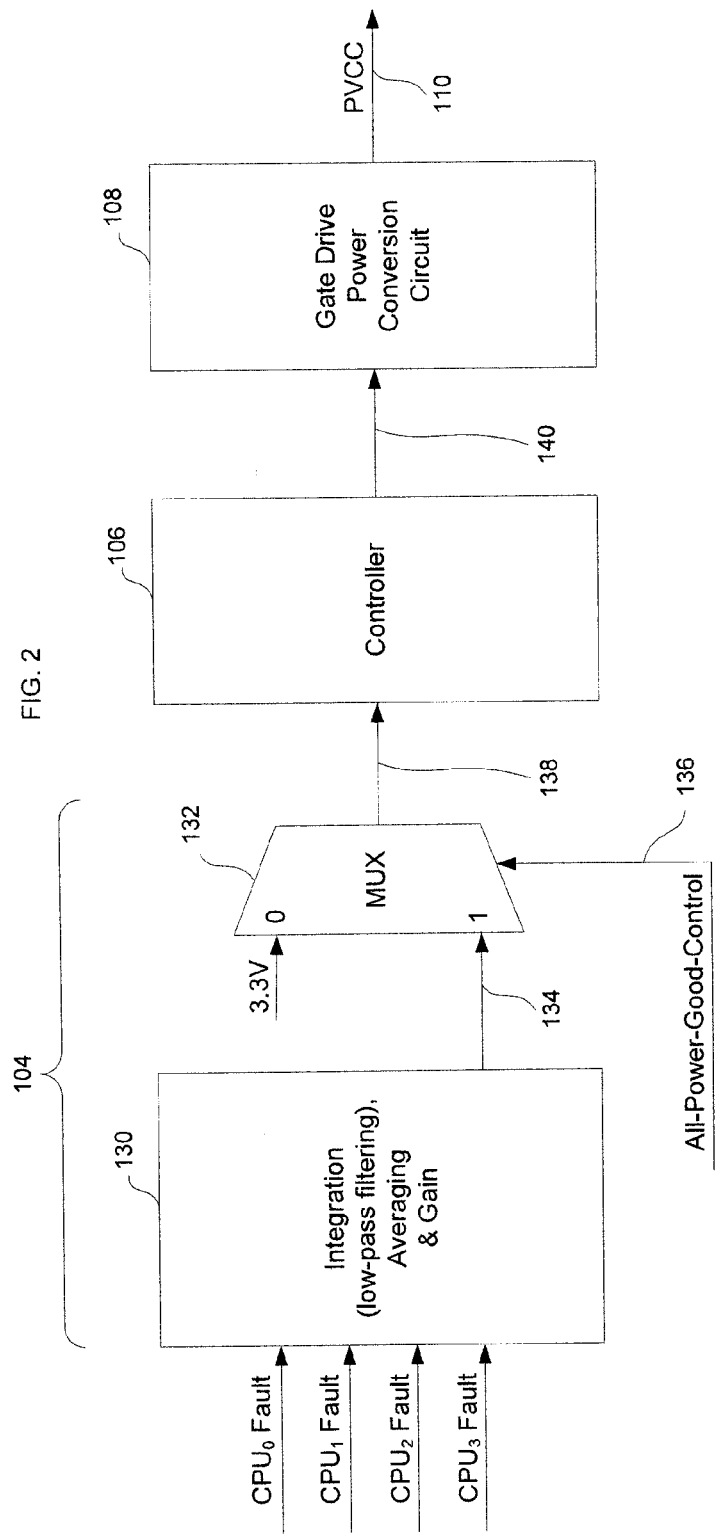
FIG. 2 illustrates features of the system of FIG. 1.

FIG. 2 illustrates aspects of the signal conditioning circuit 104 and other components in more detail. As shown in this figure, the signal conditioning circuit 104 includes a signal processing section 130 and a multiplexer (MUX) 132. The signal processing section 130 receives the load current information from the DVRMs 112 and performs integration, low pass filtering, averaging and thereon. The gain may be set to a value of 1 or some other gain.

Resultant output signal 134 is provided to one input ("1") of the multiplexer 132. Another input ("0") to the multiplexer is a power signal of, e.g., 3.3 volts. The multiplexer 132 also receives a control signal ("All-Power-Good-Control") 136. This control signal 136 is produced by reset logic (not shown in FIG. 1) which indicates that all the power supply rail levels are within their regulation specification limits. For instance, each VRM 112 may include a "ready" signal for the CPU it is coupled to. These ready signals may be ORed or otherwise combined into a common control signal 136. If this common control signal 136 indicates that the CPUs (or other load) are ready, then the multiplexer 132 is enabled. Otherwise, the multiplexer 132 is disabled.

The multiplexer 132 issues a conditioned signal 138 to controller 106, which may comprise a synchronous buck PWM controller. The controller 106 may be, by way of example only, an Intersil ISL6535 device. Details of the ISL6535 are provided in data sheet FN9255.1, © 2007 by Intersil, the entire disclosure of which is hereby incorporated by reference herein. In one example, the conditioned signal 138 is supplied to the reference input (REFIN) of the ISL6535, which is used as a control reference. The controller 106 issues control information 140 to the gate drive power conversion circuit 108.

Returning to FIG. 1, it can be seen that the circuit 108, the variable gate drive power converter, includes a pair of transistors (e.g., MOSFETS) and an inductor. In particular, there is an upper MOSFET 142, a lower MOSFET 144 and an inductor 146 having a first side coupled to node 148. The controller 106 issues a first signal (UGATE) to the gate of the upper MOSFET 142 and a second signal (LGATE) to the gate of the lower MOSFET 144. A third signal (PHASE) is connected to controller 106 via node 148. In response to the UGATE, LGATE and PHASE signal, the circuit 108 issues a PVCC signal at node 150 at the second side of the inductor 146. As shown, the PVCC signal is fed back to a feedback node (FB) of the controller 106 and also to PVCC nodes at each driver 114.

Figure 3:
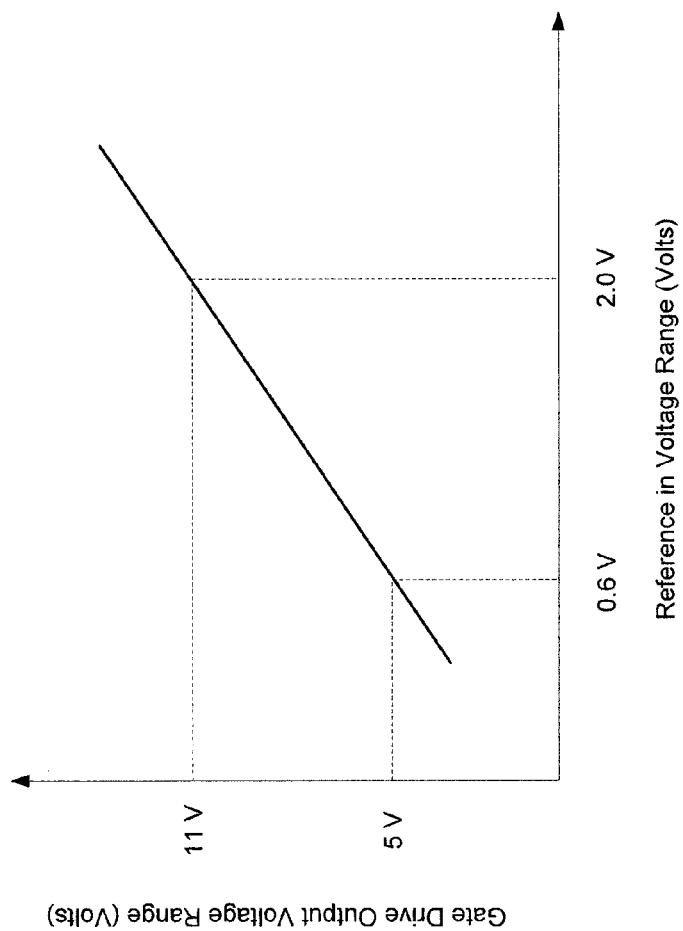
FIG. 3 illustrates a linear transfer function characteristic in accordance with aspects of the invention.

As shown in FIG. 3, a linear voltage translation (also called a linear transfer function) characteristic is produced. The horizontal axis ("Reference in Voltage Range") corresponds to the reference input ("REFIN") into PWM controller 106 (see FIG. 1) from the signal conditioning circuit 104. Output from the PWM controller 106 is the actual gate voltage level. This is shown by the vertical axis ("Gate Drive Output Voltage Range"), which represents the value of the PVCC gate drive voltage (the output).

The linear transfer function characteristic relates the voltage output (PVCC) from the controller 106, which actually drives the gates of the power converters under control, with the input voltage level, via REFIN from the signal conditioning circuit 104. The transfer function illustrated shows the linear relationship that is maintained between the input (REFIN) and output (gate drive) voltages of the controller 106.

FIGS. 4A-D illustrate an exemplary embodiment of the signal conditioning circuit 104, PWM controller 106 and power conversion circuit 108. The circuitry shown includes resistors, capacitors, inductors and other discrete components, whose values may be chosen depending upon the specific implementation. In this example, certain discrete components may be omitted. Such components are surrounded by a circle. The voltages shown are also exemplary, and will depend on the particular implementation.

Figure 4A:
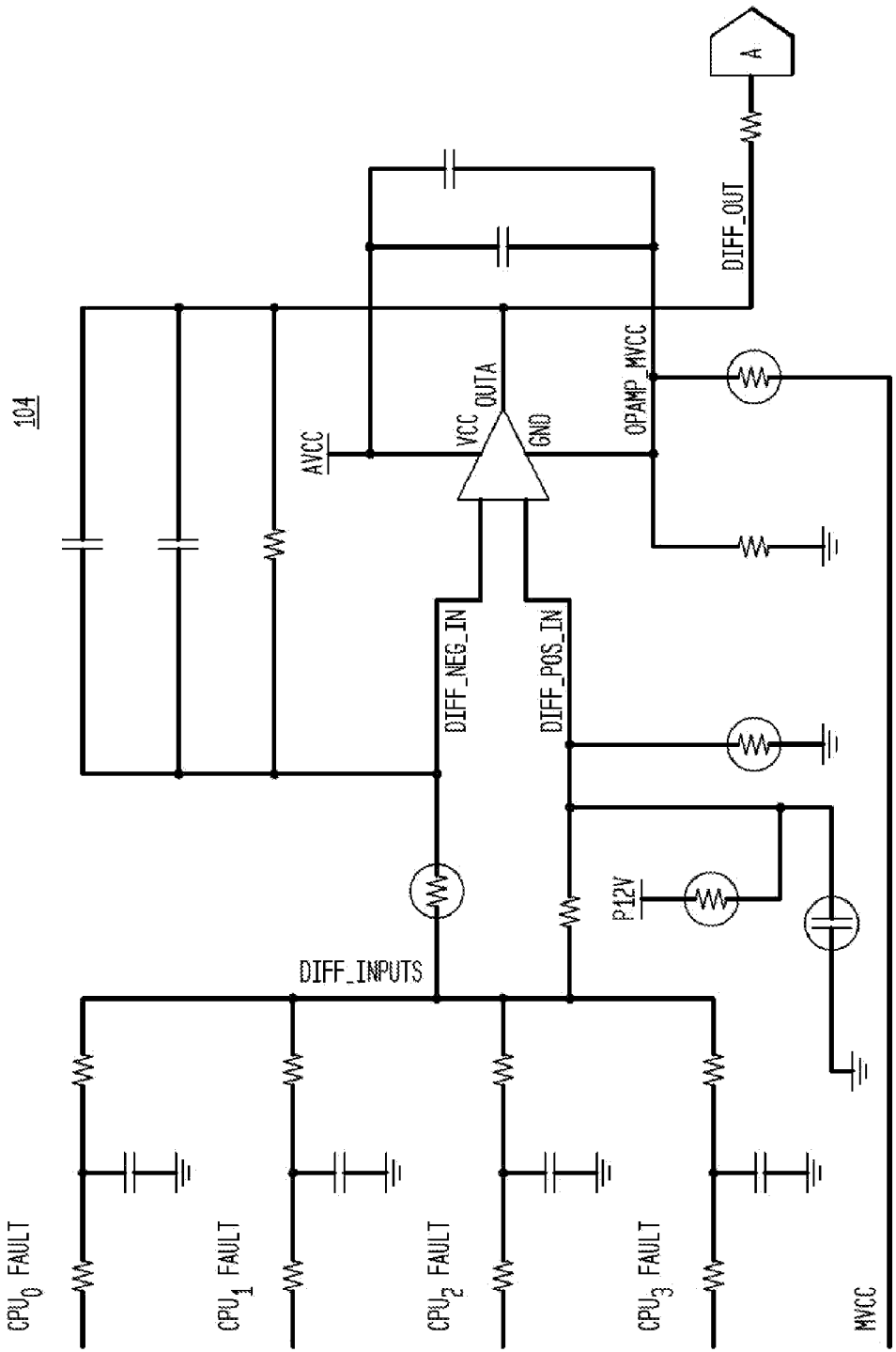
FIGS. 4A-D present an example of the multi-phase system architecture of FIGS. 1 and 2.
Figure 4B:
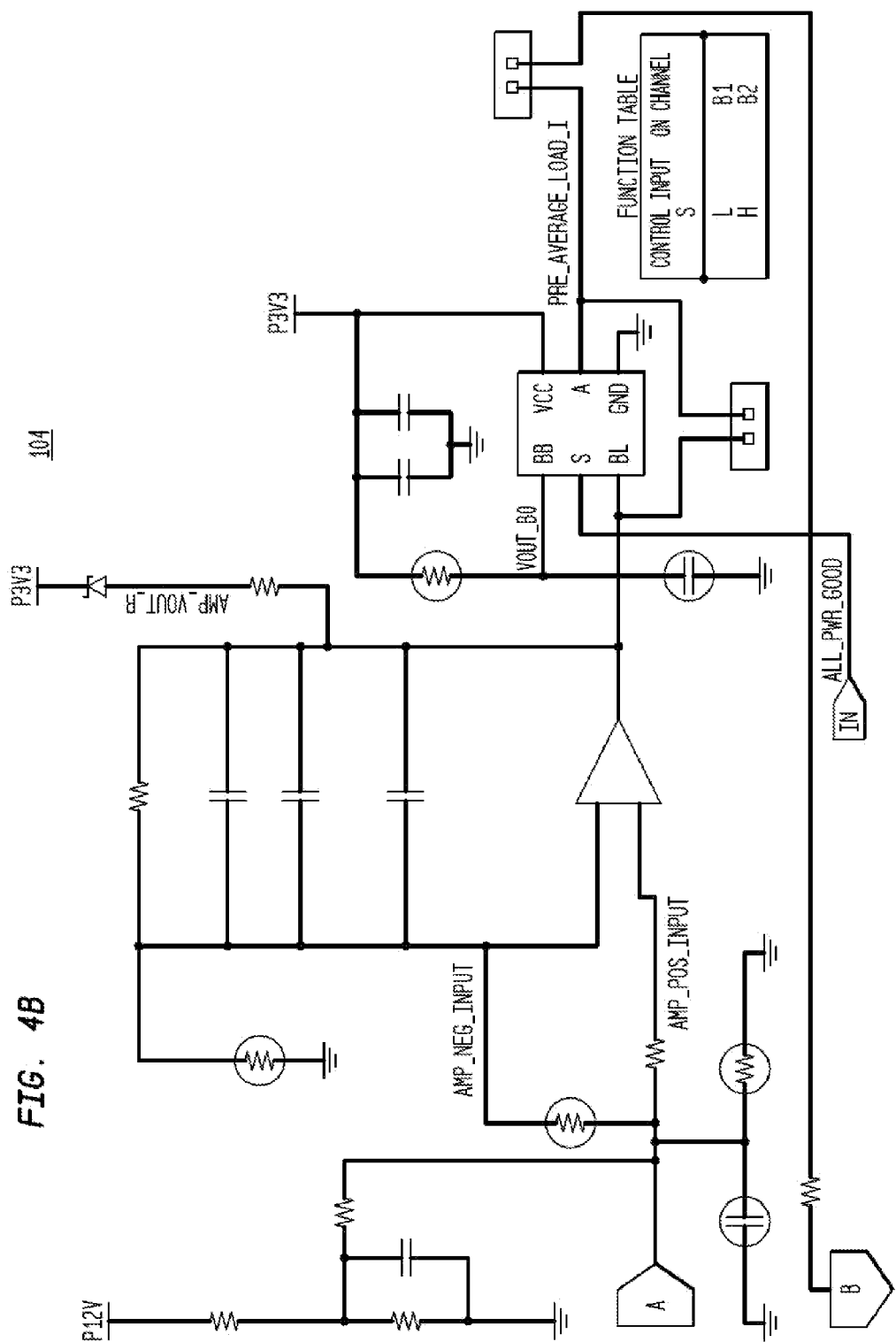
Figure 4C:
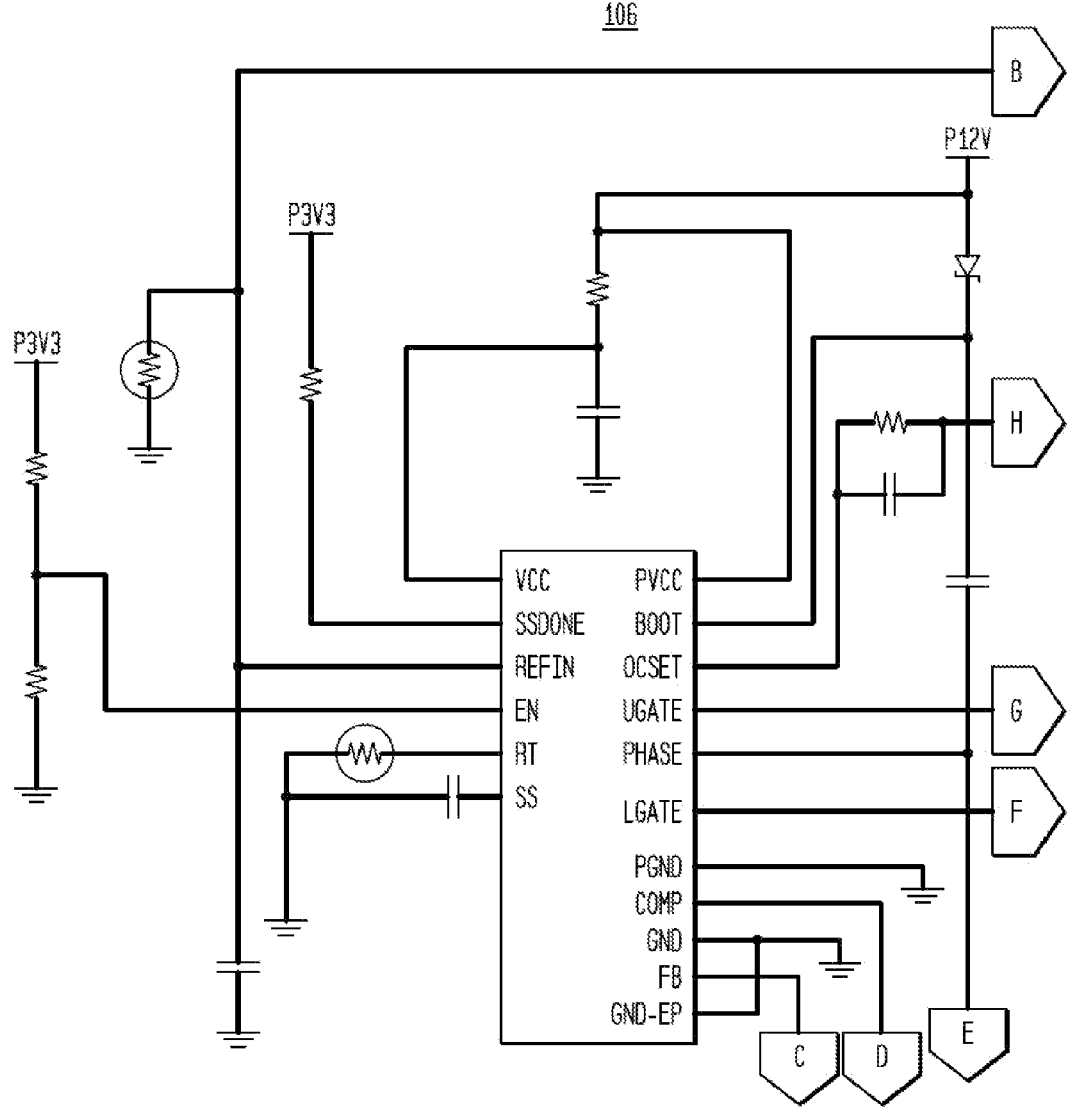
Figure 4D:
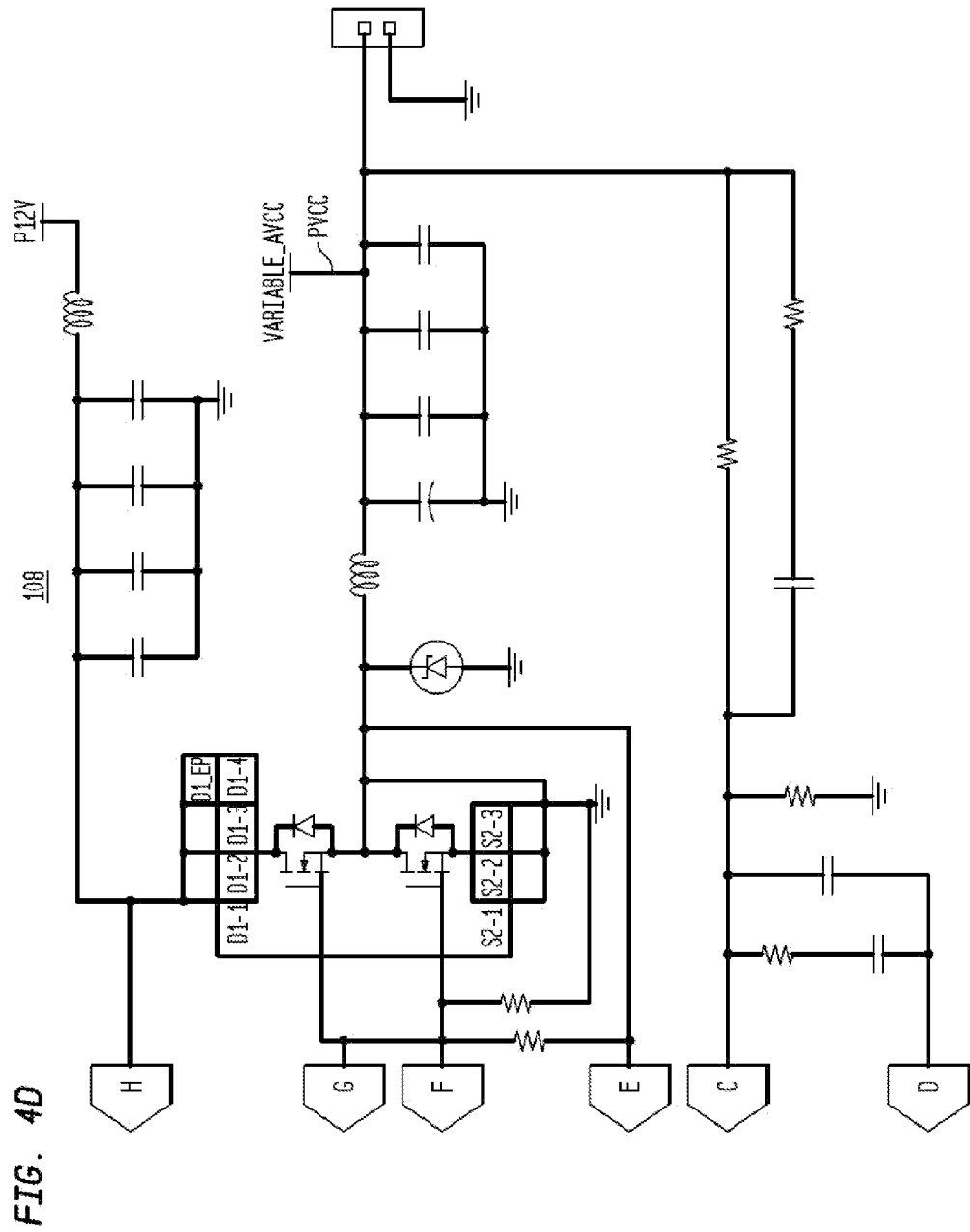

As shown in FIG. 4A, the CPU Fault inputs of FIG. 2 are applied to inputs of an operational amplifier. The resultant output ("DIFF_OUT") is received by the circuitry shown in FIG. 4B where multiplexing is performed and the conditioned signal (signal 138 of FIG. 2) is provided to the PWM controller 106 in FIG. 4C as REFIN discussed above. The controller 106 outputs upper and lower gate (UGATE and LGATE) signals (E, F and G in FIG. 4C) which are provided to the power conversion circuit 108 as shown in FIG. 4D. The result in FIG. 4D is the PVCC signal (signal 110 in FIGS. 1 and 2).

Although aspects of the invention herein have been described with reference to particular embodiments, it is to be understood that these embodiments are merely illustrative of the principles and applications of the invention. It is therefore to be understood that numerous modifications may be made to the illustrative embodiments and that other arrangements may be devised without departing from the spirit and scope of the invention as defined by the appended claims.

The invention claimed is:

1. A power control architecture, comprising:
a plurality of multi-phase buck converter modules, each module electrically connected to a load, each of the multi-phase buck converter modules being adapted to generate a load current monitor signal for its respective load;
a signal conditioning circuit electrically connected to each of the multi-phase buck converter modules, the signal conditioning circuit adapted to receive the load current monitor signals from each multi-phase buck converter module and to generate a conditioned signal therefrom;
a controller adapted to receive the conditioned signal from the signal conditioning circuit and to generate control information based upon the conditioned signal; and
a power conversion circuit adapted to receive the control information from the controller and to issue a variable driver voltage signal to each of the multi-phase buck converter modules to reduce conduction losses associated with each multi-phase buck converter module supplying power to its respective load
wherein the signal conditioning circuit includes a signal processing apparatus for integrating and averaging of the load current monitor signals and for issuing an output signal used to generate the conditioned signal; and
wherein the signal conditioning circuit further includes a multiplexer that receives the output signal from the signal processing apparatus, multiplexes the output signal with a power signal upon receipt of a control signal, and generates the conditioned signal.

2. A power control architecture, comprising:
a plurality of multi-phase buck converter modules, each module electrically connected to a load, each of the multi-phase buck converter modules being adapted to generate a load current monitor signal for its respective load;
a signal conditioning circuit electrically connected to each of the multi-phase buck converter modules, the signal conditioning circuit adapted to receive the load current monitor signals from each multi-phase buck converter module and to generate a conditioned signal therefrom;
a controller adapted to receive the conditioned signal from the signal conditioning circuit and to generate control information based upon the conditioned signal; and
a power conversion circuit adapted to receive the control information from the controller and to issue a variable driver voltage signal to each of the multi-phase buck converter modules to reduce conduction losses associated with each multi-phase buck converter module supplying power to its respective load;
wherein the power conversion circuit comprises a buck converter having a pair of transistors electrically connected to an inductive device, the inductive device has a first end and a second end, the pair of transistors are MOSFETS electrically connected to the first end of the inductive device, and the variable driver voltage signal is output from the second end of the inductive device.

3. A power control architecture, comprising:
multi-phase converter means for generate load current monitor signaling for a plurality of loads;
signal conditioning means for receiving the load current monitor signaling from the multi-phase converter means and for generating a conditioned signal therefrom;
control means for receiving the conditioned signal from signal conditioning means and for generating control information based upon the conditioned signal; and
power conversion means for receiving the control information from the control means and for issuing a variable driver voltage signal to the multi-phase converter means to reduce conduction losses associated with the multi-phase converter means supplying power to the plurality of loads.

4. The power control architecture of claim 3, wherein the signal conditioning means includes signal processing means for integrating and averaging of the load current monitor signaling and for issuing an output signal used to generate the conditioned signal.

5. A power control architecture, comprising:
multi-phase converter means for generate load current monitor signaling for a plurality of loads;
signal conditioning means for receiving the load current monitor signaling from the multi-phase converter means and for generating a conditioned signal therefrom;
control means for receiving the conditioned signal from signal conditioning means and for generating control information based upon the conditioned signal; and
power conversion means for receiving the control information from the control means and for issuing a variable driver voltage signal to the multi-phase converter means to reduce conduction losses associated with the multi-phase converter means supplying power to the plurality of loads, wherein the signal conditioning means includes signal processing means for integrating and averaging of the load current monitor signaling and for issuing an output signal used to generate the conditioned signal; and
wherein the signal conditioning means further includes multiplex means for receiving the output signal from the signal processing means, multiplexing the output signal with a power signal upon receipt of a control signal, and generating the conditioned signal.

6. A power control apparatus, comprising:
a signal conditioning circuit electrically connected to each phase of a plurality of multi-phase buck converter modules, the signal conditioning circuit adapted to receive load current monitor signals from each multi-phase buck converter module and to generate a conditioned signal therefrom;
a controller adapted to receive the conditioned signal from the signal conditioning circuit and to generate control information based upon the conditioned signal; and
a power conversion circuit adapted to receive the control information from the controller and to issue a variable driver voltage signal to each of the plurality of multi-phase buck converter modules to reduce conduction losses associated with each multi-phase buck converter module supplying power to its respective load;
wherein the signal conditioning circuit includes a signal processing apparatus for integrating and averaging of the load current monitor signals and for issuing an output signal used to generate the conditioned signal; and
wherein the signal conditioning circuit further includes a multiplexer that receives the output signal from the signal processing apparatus, multiplexes the output signal with a power signal upon receipt of a control signal, and generates the conditioned signal.

7. A power control apparatus, comprising:
a signal conditioning circuit electrically connected to each phase of a plurality of multi-phase buck converter modules, the signal conditioning circuit adapted to receive load current monitor signals from each multi-phase buck converter module and to generate a conditioned signal therefrom;
a controller adapted to receive the conditioned signal from the signal conditioning circuit and to generate control information based upon the conditioned signal; and
a power conversion circuit adapted to receive the control information from the controller and to issue a variable driver voltage signal to each of the plurality of multi-phase buck converter modules to reduce conduction losses associated with each multi-phase buck converter module supplying power to its respective load;
wherein the power conversion circuit comprises a buck converter having a pair of transistors electrically connected to an inductive device, the inductive device has a first end and a second end, the pair of transistors are MOSFETS electrically connected to the first end of the inductive device, and the variable driver voltage signal is output from the second end of the inductive device.

8. A power control method, comprising:
receiving load current monitor signals from a plurality of multi-phase buck converter module;
integrating and averaging of the received load current monitor signals;
generating a conditioned signal from the received load current monitoring signals and an output signal, the output signal being multiplexed with a power signal upon receipt of a control signal to generate the conditioned signal;
generating control information based upon the conditioned signal;
issuing a variable driver voltage signal to each of the plurality of multi-phase buck converter modules to reduce conduction losses associated with each multi-phase buck converter module supplying power to its respective load.

* * * * *

UNITED STATES PATENT AND TRADEMARK OFFICE
CERTIFICATE OF CORRECTION

| | | |
|---|---|---|
| PATENT NO. | : 8,084,884 B1 | Page 1 of 1 |
| APPLICATION NO. | : 12/498821 | |
| DATED | : December 27, 2011 | |
| INVENTOR(S) | : Srikanth Lakshmikanthan and Eduardo M. Lipiansky | |

It is certified that error appears in the above-identified patent and that said Letters Patent is hereby corrected as shown below:

Title Page, Item (57) ABSTRACT, Line 12, "cause" should read -- causes --.

In the Claims
Claim 3, Col. 7, Line 27, "generate" should read -- generating --.
Claim 5, Col. 7, Line 46, "generate" should read -- generating --.
Claim 8, Col. 8, Line 50, "module" should read -- modules --.

Signed and Sealed this
First Day of October, 2013

Teresa Stanek Rea
*Deputy Director of the United States Patent and Trademark Office*